US012752682B2

(12) United States Patent
Katoh et al.

(10) Patent No.: US 12,752,682 B2
(45) Date of Patent: Oct. 6, 2026

(54) VEHICLE SEAT STRUCTURE

(71) Applicant: TOYOTA JIDOSHA KABUSHIKI KAISHA, Toyota (JP)

(72) Inventors: Kohshi Katoh, Hadano (JP); Koki Kunugi, Fuji (JP); Yasushi Dohnoue, Seto (JP); Masatoshi Hada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 19/042,010

(22) Filed: Jan. 31, 2025

(65) Prior Publication Data

US 2025/0303937 A1 Oct. 2, 2025

(30) Foreign Application Priority Data

Apr. 1, 2024 (JP) ................................ 2024-059075

(51) Int. Cl.
*B60N 2/54* (2006.01)

(52) U.S. Cl.
CPC ................................... *B60N 2/546* (2013.01)

(58) Field of Classification Search
None
See application file for complete search history.

(56) References Cited

U.S. PATENT DOCUMENTS

2015/0300785 A1* 10/2015 Lamparter ............ B60N 2/427
297/216.17
2020/0269735 A1* 8/2020 Nagai ..................... B60N 2/06

FOREIGN PATENT DOCUMENTS

JP 2021-024473 A 2/2021

* cited by examiner

*Primary Examiner* — Andrew Sue-Ako
(74) *Attorney, Agent, or Firm* — SoraIP, Inc.

(57) ABSTRACT

A vehicle seat structure includes a seat cushion; a center member provided below the seat cushion; leaf springs connecting a front portion and a rear portion of the center member and the seat cushion; a front support shaft provided at a front portion of the seat cushion to constitute a framework of the seat cushion and extending in the seat width direction; and a rear support shaft provided at a rear portion of the seat cushion to constitute the framework of the seat cushion and extending in the seat width direction, the front portion of the center member is attached to be rotatable about an axis of the front support shaft and immovable in the seat width direction, and the rear portion of the center member is attached to be rotatable about an axis of the rear support shaft and immovable in the seat width direction.

5 Claims, 4 Drawing Sheets

VEHICLE SEAT STRUCTURE

CROSS-REFERENCE TO RELATED APPLICATION

This application claims priority to Japanese Patent Application No. 2024-059075 filed on Apr. 1, 2024, incorporated herein by reference in its entirety.

BACKGROUND

1. Technical Field

The present disclosure relates to a vehicle seat structure.

2. Description of Related Art

Japanese Unexamined Patent Application Publication No. 2021-24473 (JP 2021-24473 A) discloses an in-vehicle seat device including a support mechanism that supports a cushion pan of a seat cushion. In this in-vehicle seat device, the support mechanism includes support shafts and leaf springs, and is configured to change the rocking center position of the cushion pan by changing the inclination angles of the leaf springs.

SUMMARY

In the structure described in JP 2021-24473 A, however, the front leaf springs and the rear leaf springs are independent. Therefore, in a structure including a lift-up mechanism that moves the seat cushion up and down by rotating the support shafts, there is a possibility that the function of the leaf springs cannot be maintained satisfactorily.

An object of the present disclosure is to provide a vehicle seat structure in which a seat cushion can be rocked in a seat width direction by leaf springs and the function of the leaf springs can be maintained satisfactorily even when support shafts are rotated.

A vehicle seat structure according to claim 1 includes:

a seat cushion that supports buttocks and thighs of an occupant from below;

a center member that is provided below the seat cushion and at a center in a seat width direction and extends in a seat front-rear direction;

leaf springs connecting a front portion and a rear portion of the center member and the seat cushion;

a front support shaft that is provided at a front portion of the seat cushion to constitute a framework of the seat cushion and extends in the seat width direction; and a rear support shaft that is provided at a rear portion of the seat cushion to constitute the framework of the seat cushion and extends in the seat width direction.

The front portion of the center member is attached to be rotatable about an axis of the front support shaft and immovable in the seat width direction.

The rear portion of the center member is attached to be rotatable about an axis of the rear support shaft and immovable in the seat width direction.

In the vehicle seat structure according to claim 1, the center member is provided below the seat cushion and at the center in the seat width direction, and the front portion and the rear portion of the center member are connected to the seat cushion by the leaf springs. Accordingly, when a load is input to the seat cushion, the leaf springs are elastically deformed, and the posture of the seated person can be maintained satisfactorily.

The front support shaft is provided at the front portion of the seat cushion. The rear support shaft is provided at the rear portion of the seat cushion. The front support shaft and the rear support shaft extend in the seat width direction. The front portion of the center member is attached to be rotatable about the axis of the front support shaft and immovable in the seat width direction. The rear portion of the center member is attached to be rotatable about the axis of the rear support shaft and immovable in the seat width direction. Accordingly, even when the seat cushion is moved up and down by rotating the support shafts, the angles of the leaf springs are not changed. Since the front leaf springs and the rear leaf springs are connected via the center member, it is possible to suppress independent elastic deformation of the front leaf springs and the rear leaf springs. The term "immovable" as used herein does not refer to only a state in which movement is completely restricted, but is a concept broadly including a configuration in which the center member can be slightly moved within a range in which the center member is not twisted.

In the vehicle seat structure according to claim 2, in claim 1, the leaf springs are elastically deformable in the seat width direction, and are provided at four corners of the seat cushion.

In the vehicle seat structure according to claim 2, the leaf springs are provided at the four corners of the seat cushion to easily follow the movement of the seat cushion.

In the vehicle seat structure according to claim 3, in claim 1, the front portion of the center member is attached at one location to the front support shaft, and the rear portion of the center member is attached at two locations to the rear support shaft.

In the vehicle seat structure according to claim 3, the front portion of the center member is attached at only one location to the front support shaft. Therefore, it is possible to suppress interference with a peripheral member as compared with a configuration in which the front portion is attached at a plurality of locations. Since the rear portion of the center member to which a load larger than that on the front side is input is attached at two locations to the rear support shaft, the attachment state of the center member and the rear support shaft can be maintained satisfactorily as compared with a configuration in which the rear portion is attached at only one location.

In the vehicle seat structure according to claim 4, in claim 1, an outer peripheral surface of the front support shaft is provided with front flange portions that restrict movement of the front portion of the center member in the seat width direction, and an outer peripheral surface of the rear support shaft is provided with rear flange portions that restrict movement of the rear portion of the center member in the seat width direction.

In the vehicle seat structure according to claim 4, the movement of the front portion of the center member in the seat width direction is restricted by the front flange portions of the front support shaft, and the movement of the rear portion of the center member in the seat width direction is restricted by the rear flange portions of the rear support shaft. Thus, the movement of the center member in the seat width direction can be restricted with the simple structure.

In the vehicle seat structure according to claim 5, in any one of claims 1 to 4, a contact portion of the front support shaft with the front portion of the center member is provided with a front collar member having a friction coefficient smaller than a friction coefficient of the front support shaft, and a contact portion of the rear support shaft with the rear portion of the center member is provided with a rear collar member having a friction coefficient smaller than a friction coefficient of the rear support shaft.

In the vehicle seat structure according to claim 5, the front collar member has a friction coefficient smaller than that of the front support shaft, and the rear collar member has a friction coefficient smaller than that of the rear support shaft. Thus, the rocking of the center member relative to the front support shaft and the rear support shaft is less likely to be restricted as compared with a configuration in which the center member is directly attached to the front support shaft and the rear support shaft.

As described above, with the vehicle seat structure of the present disclosure, the function of the leaf springs can be maintained satisfactorily even when the support shafts are rotated in the configuration in which the seat cushion can be rocked in the seat width direction by the leaf springs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle seat structure according to an embodiment will be described with reference to the drawings.

Figure 1:
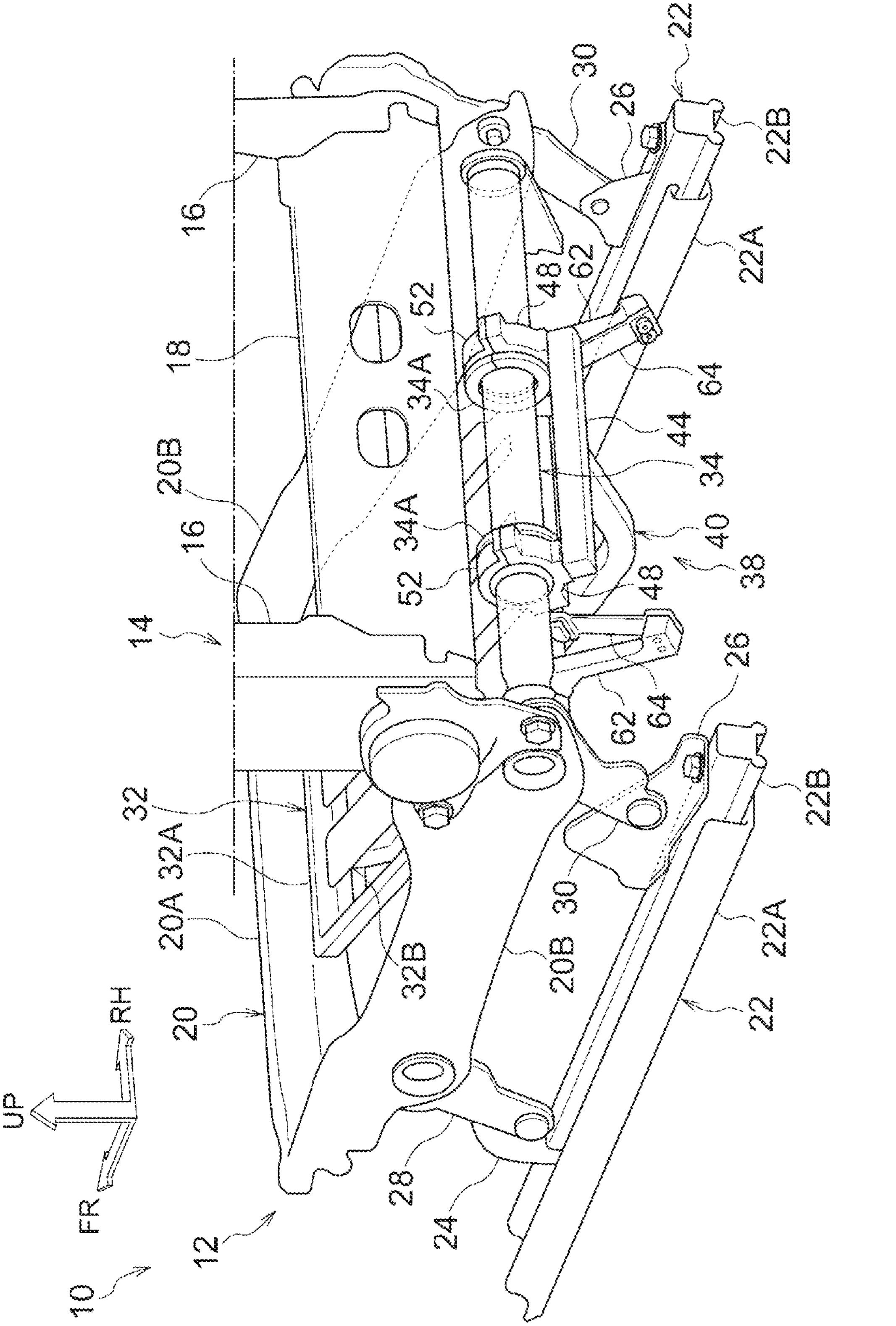
FIG. 1 is an enlarged perspective view illustrating a vehicle seat according to an embodiment.
Figure 2:
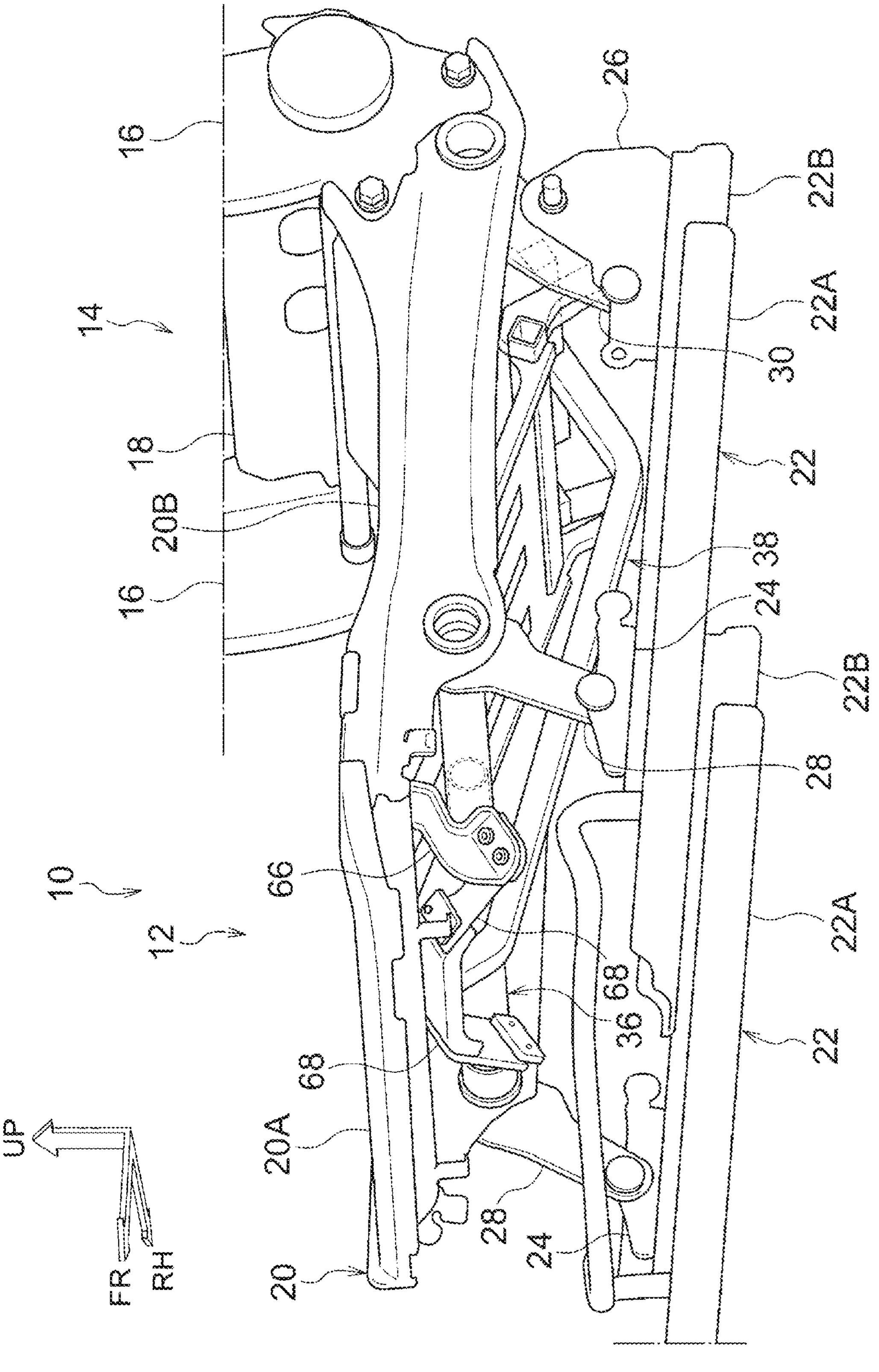
FIG. 2 is an enlarged perspective view of the vehicle seat of FIG. 1 from another angle.

FIG. 1 is an enlarged perspective view illustrating a vehicle seat 10 to which a vehicle seat structure according to an embodiment is applied. Specifically, the frame of the lower portion of the vehicle seat 10 is a perspective view viewed from the seat left rear. FIG. 2 is an enlarged perspective view of the vehicle seat 10 of FIG. 1 viewed from another angle. Note that the arrow FR, the arrow UP, and the arrow RH in the drawing indicate the seat front direction, the seat upper direction, and the seat right direction of the vehicle seat 10, respectively. In the following description, when the front, rear, up, down, and left and right directions are used without any specific mention, the front and rear directions in the front-rear direction of the seat, the up and down directions of the seat, and the left and right directions of the seat width direction are respectively indicated.

As illustrated in FIGS. 1 and 2, the vehicle seat 10 to which the vehicle seat structure according to the present embodiment is applied is a seat installed in a vehicle cabin. The vehicle seat 10 includes a seat back 14 capable of supporting the back of the occupant from the seat rear side, and a seat cushion 12 capable of supporting the buttocks and thighs of the occupant from the seat lower side.

The seat back 14 includes a pair of left and right seat back side frames 16 spaced apart in the seat width direction, and a seat back lower frame 18 connecting the lower end portions of the seat back side frames 16 in the seat width direction. Further, a seat back upper frame (not shown) connecting the upper end portions of the seat back side frame 16 to each other in the seat width direction is provided at the upper end portion of the seat back 14. In addition, a headrest (not shown) capable of supporting the head of the occupant is provided at an upper portion of the seat back 14.

The pair of left and right seat back side frames 16 are provided in parallel to each other, and a lower end portion of the seat back side frame 16 is rotatably connected to the seat cushion 12. Further, although not shown, a seat back pad (not shown) is provided between the left and right seat back side frames 16, and the back of the occupant is supported by the seat back pad. Further, the seat back pad is used in a state of being covered with a skin constituting a design surface together with the seat back side frame 16, the seat back lower frame 18, and the like.

The seat cushion 12 includes a seat cushion frame 20 that constitutes a skeleton, and the seat cushion frame 20 includes a seat cushion front frame 20A that extends the seat front end portion in the seat width-direction.

The seat cushion side frame 20B extends from both seat width direction end portions of the seat cushion front frame 20A toward the seat rear side. Therefore, the seat cushion frame 20 is formed in a substantially U-shape in which the seat rear side is opened in a plan view by the seat cushion front frame 20A and the left and right seat cushion side frames 20B.

Here, the rear end portions of the seat cushion side frame 20B are connected to each other by the rear support shaft 34. The front end portions of the seat cushion side frame 20B are connected to each other by a front support shaft 36. Details of the rear support shaft 34 and the front support shaft 36 will be described later.

A pair of left and right seat rails 22 are disposed below the seat cushion 12. Each of the seat rails 22 includes a lower rail 22A and an upper rail 22B, and the lower rail 22A is fixed to a floor panel constituting a floor portion of a vehicle cabin (not shown).

The lower rail 22A extends in the seat front-rear direction, and an upper rail 22B is disposed inside the lower rail 22A. The upper rail 22B extends in the seat front-rear direction as in the lower rail 22A, and is movable in the seat front-rear direction with respect to the lower rail 22A.

A front bracket 24 is attached to a front portion of the upper rail 22B, and a rear bracket 26 is attached to a rear portion of the upper rail 22B. Further, the front bracket 24 is connected to the front portion of the seat cushion frame 20 via the front link 28, and the rear bracket 26 is connected to the rear portion of the seat cushion frame 20 via the rear link 30. Therefore, the seat cushion 12 can be moved in the seat front-rear direction by moving the upper rail 22B in the seat front-rear direction with respect to the lower rail 22A.

The front link 28 is formed in a flat plate shape, and a lower end portion of the front link 28 is rotatably attached to the front bracket 24. An upper end portion of the front link 28 is rotatably attached to the seat cushion frame 20.

The rear link 30 is formed in a flat plate shape, and a lower end portion of the rear link 30 is rotatably attached to the rear bracket 26. The upper end portion of the rear link 30 is rotatably attached to the seat cushion frame 20.

Here, a motor (not shown) is connected to at least one of the rotation shaft of the front link 28 and the rotation shaft of the rear link 30. When the motor is driven, the front link 28 and the rear link 30 are rotated so that the seat cushion frame 20 can be moved up and down. Instead of the motor, a lift-up mechanism may be adopted in which the occupant can manually rotate the front link 28 and the rear link 30.

A cushion pan 32 is disposed inside the seat cushion frame 20. The cushion pan 32 includes a frame portion 32A having a substantially rectangular outer shape and a plurality of elongated seat plate 32B provided inside the frame portion 32A. Here, the cushion pan 32 is supported by the seat cushion frame 20 via the support mechanism 38.

Support Mechanism 38

Hereinafter, the support mechanism 38, which is a main part of the present disclosure, will be described.

Figure 3:
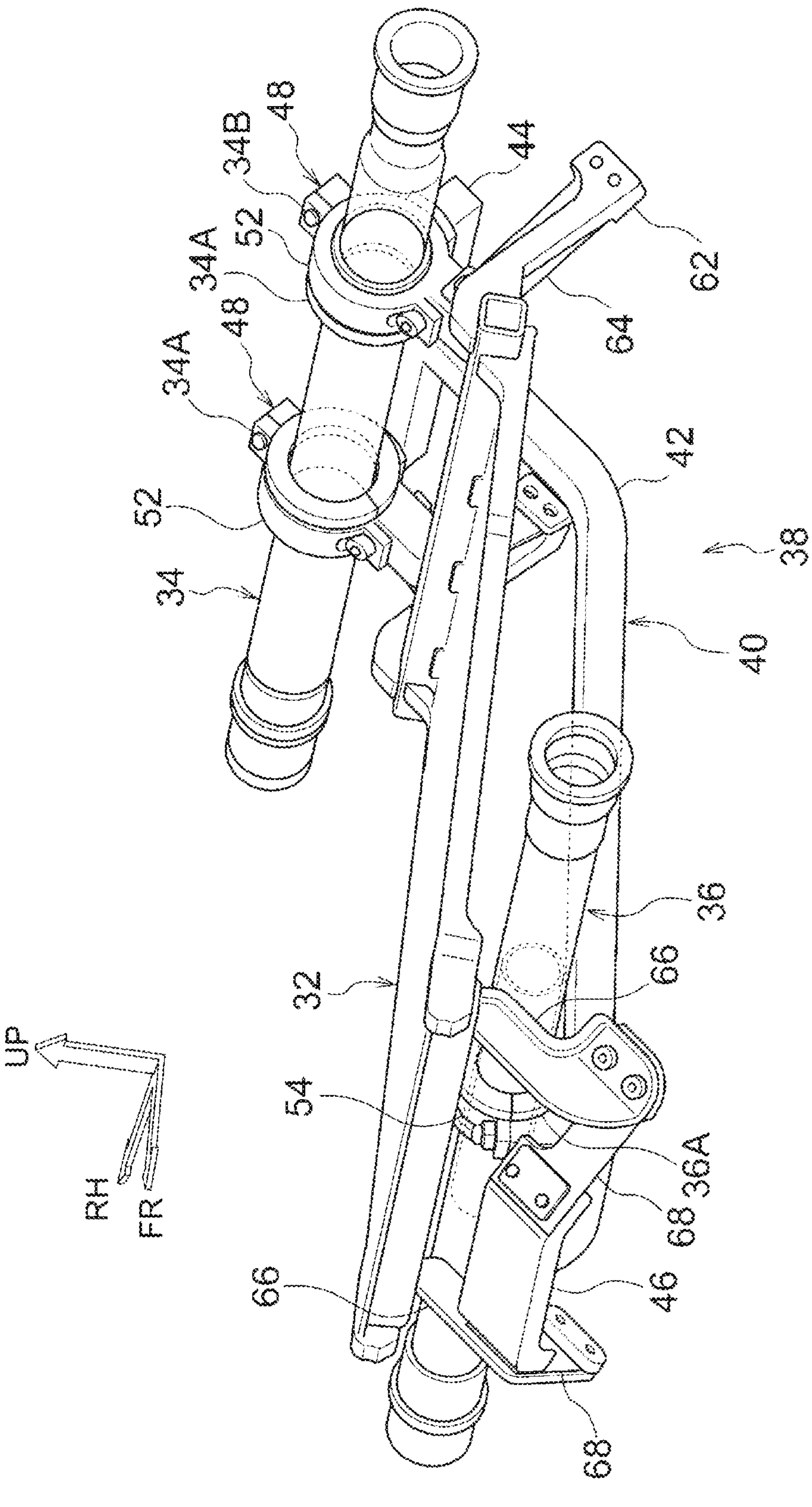
FIG. 3 is an enlarged perspective view of a main part showing an enlarged support mechanism according to the embodiment.

As shown in FIG. 3, the support mechanism 38 includes a center member 40, a rear leaf spring 64, and a front leaf spring 68. The center member 40 is an elongated member provided below the seat cushion frame 20 and at a center portion in the seat width direction and extending in the seat front-rear direction, and is formed of a material having high rigidity.

A rear portion of the center member 40 extends obliquely toward the seat upper side and the seat rear side, and a rear base 44 is provided at a rear end portion of the center member 40. The rear base 44 extends in the sheet width direction, and a rear lower ring 48 is provided at both end portions of the rear base 44 in the sheet width direction.

The rear lower ring 48 is formed in a substantially arc shape and is joined to the rear base 44 by welding or the like. Further, the rear lower ring 48 is disposed along the lower outer periphery of the rear support shaft 34.

Figure 4:
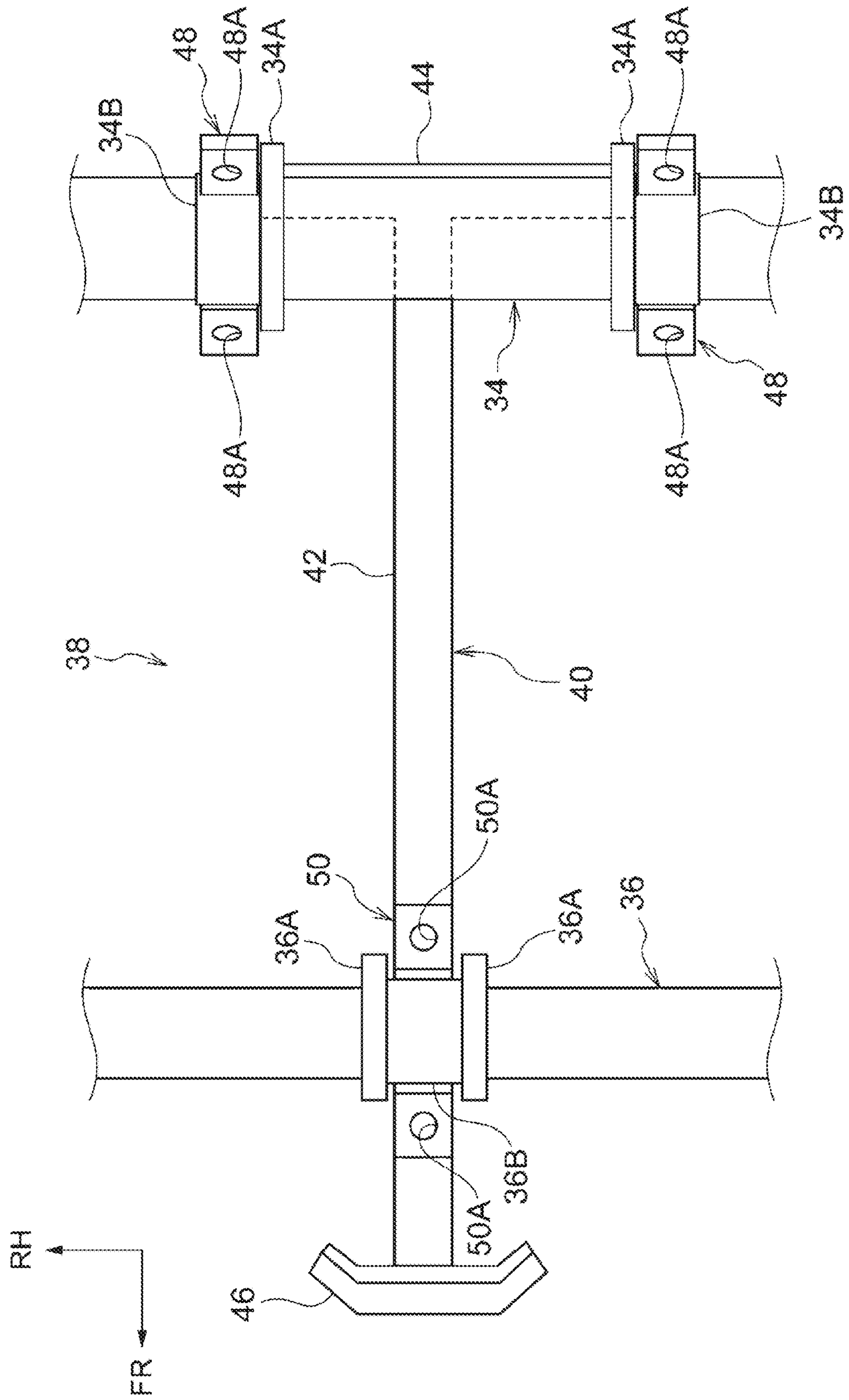
FIG. 4 is a plan view illustrating a main part of the support mechanism according to the embodiment.

As shown in FIG. 4, screw holes 48A are formed on both end surfaces of the rear lower ring 48. As shown in FIG. 3, a rear upper ring 52 is attached to the rear lower ring 48. The rear lower ring 48 and the rear upper ring 52 are fastened by bolts while the rear support shaft 34 is sandwiched therebetween.

Here, a rear flange portion 34A is provided on an outer peripheral surface of the rear support shaft 34 to restrict the rear portion of the center member 40 from moving in the seat-width direction.

As shown in FIG. 4, two rear flange portions 34A are provided at intervals in the seat width-direction, and are each formed in a substantially annular shape. Further, the rear collar member 34B is integrally formed on the rear flange portion 34A. The rear collar member 34B is fixed to the rear support shaft 34, and the front face of the rear collar member 34B has a lower frictional coefficient than the rear support shaft 34. Since the rear collar member 34B is provided at a part contacting the rear lower ring 48 and the rear upper ring 52, the frictional force generated between the rear lower ring 48 and the rear upper ring 52 and the rear support shaft 34 is small.

Here, as shown in FIGS. 1 and 3, one end portion (upper end portion) of the rear leaf spring 64 is fixed to the rear lower ring 48. The rear leaf spring 64 is fixed to each of the pair of left and right rear lower rings 48, and is formed in a long flat plate shape having a sheet width direction as a plate thickness direction. That is, the rear leaf spring 64 is elastically deformable in the sheet width direction.

Each of the pair of rear leaf springs 64 extends obliquely from the rear lower ring 48 toward the seat lower side and the seat rear side, and a lower end portion of the rear connecting member 62 is fastened to a lower end portion of the rear leaf spring 64.

The rear connecting member 62 has higher rigidity than the rear leaf spring 64, and is disposed so as to be inclined from the rear leaf spring 64 toward the seat front side and the seat upper side when viewed from the seat width direction. The upper end portion of the rear connecting member 62 is fixed to the rear end portion of the cushion pan 32 on the frame portion 32A. Accordingly, when an external force in the seat width direction is input to the cushion pan 32 from the occupant seated on the vehicle seat 10, the rear leaf spring 64 is elastically deformed. As a result, the rear portion of the cushion pan 32 is allowed to move in the seat width direction, and a reaction force to be restored is applied to the rear portion of the cushion pan 32.

Further, an external force moving in the seat width direction is applied to the rear lower ring 48 and the rear upper ring 52 by the rear leaf spring 64. However, when the rear lower ring 48 and the rear upper ring 52 are locked to the rear flange portion 34A, the seat-width-direction movements are restricted. On the other hand, since the rear portion of the center member 40 is attached to the rear support shaft 34 via the rear collar member 34B, the center member 40 is rotatable about the axis of the rear support shaft 34.

As shown in FIGS. 2 and 3, the front portion of the center member 40 extends obliquely toward the seat upper side and the seat front side, and a front base 46 is provided at the front end portion of the center member 40. The front base 46 extends in the sheet width direction, and one end portion of the front leaf spring 68 is fastened to both end portions of the front base 46 in the sheet width direction.

A pair of left and right front leaf springs 68 are provided, and the front leaf springs 68 are inclined downward in the sheet width direction from the inner side in the sheet width direction toward the outer side in the sheet width direction when viewed from the front of the sheet. Further, the front leaf spring 68 is inclined downward from the seat front side toward the seat rear side as viewed from the seat width direction, and is configured to be elastically deformable in the seat width direction.

A lower end portion of the front connecting member 66 is fastened to a lower end portion of the front leaf spring 68. The front connecting member 66 has higher rigidity than the front leaf spring 68, and extends from the front leaf spring 68 to the seat width direction outer side and the seat upper side. An upper end portion of the front connecting member 66 is fixed to a front end portion of the cushion pan 32 on the frame portion 32A.

As shown in FIG. 4, in the center member 40, a front lower ring 50 is provided on the seat rear side of the front base 46. The front lower ring 50 is formed in a substantially arc shape and is joined to the center member 40 by welding or the like. Further, the front lower ring 50 is disposed along the lower outer periphery of the front support shaft 36.

Screw holes 50A are formed on both end surfaces of the front lower ring 50. As shown in FIG. 2, a front upper ring 54 is attached to the front lower ring 50, and the front lower ring 50 and the front upper ring 54 are fastened by bolts in a state where the front support shaft 36 is sandwiched therebetween.

Here, a front flange portion 36A is provided on an outer peripheral surface of the front support shaft 36 to restrict the front portion of the center member 40 from moving in the seat-width direction.

As shown in FIG. 4, two front flange portions 36A are provided at intervals in the seat width direction on the inner side in the seat width direction from the rear flange portion 34A, and are formed in a substantially annular shape. Further, the front collar member 36B is integrally formed on the front flange portion 36A. The front collar member 36B is fixed to the front support shaft 36, and the front collar member 36B has a lower frictional coefficient than the front support shaft 36. Since the front collar member 36B is provided at a part contacting the front lower ring 50 and the front upper ring 54, the frictional force generated between the front lower ring 50 and the front upper ring 54 and the front support shaft 36 is small.

Accordingly, when an external force in the seat width direction is input to the cushion pan 32 from the occupant seated on the vehicle seat 10, the rear leaf spring 64 is elastically deformed. As a result, the rear portion of the cushion pan 32 is allowed to move in the seat width direction, and a reaction force to be restored is applied to the rear portion of the cushion pan 32.

Further, an external force that moves in the seat width direction acts on the front lower ring 50 and the front upper ring 54 by the front leaf spring 68. However, when the front lower ring 50 and the front upper ring 54 are locked to the front flange portion 36A, the seat-width-direction movements are restricted. On the other hand, since the front portion of the center member 40 is attached to the front support shaft 36 via the front collar member 36B, the center member 40 is rotatable about the axis of the front support shaft 36.

As described above, the front portion of the center member 40 and the seat cushion 12 are connected via the front leaf spring 68, and the rear portion of the center member 40 and the seat cushion 12 are connected via the rear leaf spring 64. Further, the front portion of the center member 40 is attached to the front support shaft 36 at one location, and the rear portion of the center member 40 is attached to the rear support shaft 34 at two locations.

Operations

Next, the operation of the vehicle seat structure according to the present embodiment will be described.

In the vehicle seat structure according to the present embodiment, as shown in FIGS. 1 to 3, the center member 40 is provided below the seat cushion 12 and at the center portion in the seat width direction. The front and rear portions of the center member 40 are connected to the seat cushion 12 by a rear leaf spring 64 and a front leaf spring 68, respectively. Accordingly, when a load is input to the seat cushion 12, the rear leaf spring 64 and the front leaf spring 68 are elastically deformed, so that the posture of the seated person can be maintained satisfactorily.

Further, a front support shaft 36 is provided at a front portion of the seat cushion 12, a rear support shaft 34 is provided at a rear portion of the seat cushion 12, and the front support shaft 36 and the rear support shaft 34 extend in the seat width direction.

Here, the front portion of the center member 40 is attached so as to be rotatable about the axis of the front support shaft 36 and not movable in the seat width direction. Further, the rear portion of the center member 40 is rotatably mounted around the axis of the rear support shaft 34 and is immovable in the seat width direction. Thus, even when the seat cushion 12 is moved up and down by rotating the front support shaft 36 and the rear support shaft 34, the angles of the front leaf spring 68 and the rear leaf spring 64 are not changed. That is, in the configuration in which the seat cushion 12 can be swung in the seat width direction by the leaf spring, the function of the leaf spring can be maintained satisfactorily even when the support shaft is rotated.

Further, since the front leaf spring 68 and the rear leaf spring 64 are connected via the center member 40, a total of four leaf springs of the two front leaf springs 68 and the two rear leaf springs 64 can be elastically deformed in the same manner. In other words, it is possible to prevent the relative angle between the swing angle of the pair of front leaf springs 68 and the swing angle of the pair of rear leaf springs 64 from changing. As a result, it is possible to prevent the front leaf spring 68 and the rear leaf spring 64 from being elastically deformed independently.

In particular, in the present embodiment, by providing the four leaf springs at the four corners of the seat cushion 12, the leaf springs can easily follow the movement of the seat cushion 12 as compared with a structure in which the leaf springs are disposed at the central portion of the seat cushion 12.

Further, in the present embodiment, since the front portion of the center member 40 is attached to the front support shaft 36 at only one location, as compared with a configuration in which the front portion and the front support shaft 36 of the center member 40 is attached at a plurality of locations, it is possible to suppress interference with the peripheral member.

On the other hand, the rear part of the center member 40 to which a load larger than the front side is input is attached to the rear support shaft 34 at two places. Therefore, as compared with a configuration in which the rear portion and the rear support shaft 34 of the center member 40 are mounted at only one place, the mounting state of the center member 40 and the rear support shaft 34 can be maintained satisfactorily.

That is, since a larger load is input from the occupant to the rear portion of the center member 40 than the front portion, the attachment portion between the center member 40 and the rear support shaft 34 can be prevented from being damaged by receiving the load while being distributed at a plurality of locations.

Furthermore, in the present embodiment, as shown in FIG. 4, the front portion of the center member 40 is restricted from moving in the seat width-direction by the front flange portion 36A of the front support shaft 36. The rear portion of the center member 40 is restricted from moving in the seat width-direction by the rear flange portion 34A of the rear support shaft 34. Thus, the movement of the center member 40 in the seat width direction can be restricted with a simple structure.

Further, in the present embodiment, the front collar member 36B has a friction coefficient smaller than that of the front support shaft 36, and the rear collar member 34B has a friction coefficient smaller than that of the rear support shaft 34. As a result, as compared with a configuration in which the center member 40 is directly attached to the front support shaft 36 and the rear support shaft 34, the swing of the center member 40 with respect to the front support shaft 36 and the rear support shaft 34 is less likely to be restricted. In other words, the center member 40 can be smoothly swung with respect to the front support shaft 36 and the rear support shaft 34.

Although the vehicle seat structure according to the embodiment has been described above, it is needless to say that the vehicle seat structure can be implemented in various forms without departing from the gist of the present disclosure. For example, although the above-described embodiment includes the lift-up mechanism capable of moving the seat cushion 12 up and down, the present disclosure is not limited thereto and may be applied to the vehicle seat 10 that does not include the lift-up mechanism.

Further, in the above-described embodiment, the seat cushion 12 is supported by the pair of front leaf springs 68 and the pair of rear leaf springs 64 so as to be swingable in the seat width direction. However, the present disclosure is not limited thereto, and the seat cushion 12 may be swingably supported in the seat width direction by another member instead of the leaf spring.

Further, in the above-described embodiment, the rear portion of the center member 40 is rotatably mounted around the axis of the rear support shaft 34 by sandwiching the rear support shaft 34 between the rear lower ring 48 and the rear upper ring 52, but the present disclosure is not limited thereto, and other configurations may be employed. Similarly, in the above-described embodiment, the front portion of the center member 40 is rotatably mounted around the axis of the front support shaft 36 by sandwiching the front support shaft 36 between the front lower ring 50 and the front upper ring 54, but the present disclosure is not limited thereto, and other configurations may be employed. For example, the rear portion of the center member 40 may be rotatable about the axis of the rear support shaft 34 by connecting the rear portion of the center member 40 and the rear support shaft 34 via a bearing or the like.

With respect to the above embodiments, the following supplementary notes are disclosed.

APPENDIX 1

A seat cushion for supporting the buttocks and thighs of an occupant from below, A center member provided below the seat cushion and at a center portion in the seat width direction and extending in the seat front-rear direction;

A leaf spring connecting the front and rear portions of the center member and the seat cushion, A front support shaft provided at a front portion of the seat cushion and constituting a skeleton of the seat cushion and extending in a seat width direction;

A rear support shaft provided at a rear portion of the seat cushion and constituting a skeleton of the seat cushion and extending in a seat width direction, wherein The front portion of the center member is mounted so as not to be movable in the seat width direction and rotatable about the axis of the front support shaft, A vehicle seat structure in which a rear portion of the center member is mounted so as to be rotatable about an axis of the rear support shaft and to be immovable in a seat width direction.

APPENDIX 2

The vehicle seat structure according to claim 1, wherein the leaf spring is configured to be elastically deformable in the seat width direction, and is provided at four corners of the seat cushion.

APPENDIX 3

The front portion of the center member is attached at one location to the front support shaft, The vehicle seat structure according to Appendix 1 or 2, wherein a rear portion of the center member is attached to the rear support shaft at two locations.

APPENDIX 4

The outer peripheral surface of the front support shaft, a front flange portion for restricting the movement in the seat width direction of the front portion of the center member is provided, The vehicle seat structure according to any one of Appendices 1 to 3, wherein a rear flange portion that restricts movement of the rear portion of the center member in the seat width direction is provided on an outer peripheral surface of the rear support shaft.

APPENDIX 5

A front collar member having a friction coefficient smaller than that of the front support shaft is provided at a contact portion of the front support shaft with a front portion of the center member.

The vehicle seat structure according to any one of Appendices 1 to 4, wherein a rear collar member having a friction coefficient smaller than that of the rear support shaft is provided at a contact portion of the rear support shaft with a rear portion of the center member.

What is claimed is:

1. A vehicle seat structure comprising:

a seat cushion that supports buttocks and thighs of an occupant from below;

a center member that is provided below the seat cushion and at a center in a seat width direction and extends in a seat front-rear direction;

leaf springs connecting a front portion and a rear portion of the center member and the seat cushion;

a front support shaft that is provided at a front portion of the seat cushion to constitute a framework of the seat cushion and extends in the seat width direction; and a rear support shaft that is provided at a rear portion of the seat cushion to constitute the framework of the seat cushion and extends in the seat width direction, wherein:

the front portion of the center member is attached to be rotatable about an axis of the front support shaft and immovable in the seat width direction; and the rear portion of the center member is attached to be rotatable about an axis of the rear support shaft and immovable in the seat width direction.

2. The vehicle seat structure according to claim 1, wherein the leaf springs are elastically deformable in the seat width direction, and are provided at four corners of the seat cushion.

3. The vehicle seat structure according to claim 1, wherein:

the front portion of the center member is attached at one location to the front support shaft; and the rear portion of the center member is attached at two locations to the rear support shaft.

4. The vehicle seat structure according to claim 1, wherein:

an outer peripheral surface of the front support shaft is provided with front flange portions that restrict movement of the front portion of the center member in the seat width direction; and an outer peripheral surface of the rear support shaft is provided with rear flange portions that restrict movement of the rear portion of the center member in the seat width direction.

5. The vehicle seat structure according to any one of claim 1, wherein:

a contact portion of the front support shaft with the front portion of the center member is provided with a front collar member having a friction coefficient smaller than a friction coefficient of the front support shaft; and a contact portion of the rear support shaft with the rear portion of the center member is provided with a rear collar member having a friction coefficient smaller than a friction coefficient of the rear support shaft.

* * * * *